(12) United States Patent
Yau et al.

(10) Patent No.: US 10,599,848 B1
(45) Date of Patent: Mar. 24, 2020

(54) USE OF SECURITY KEY TO ENABLE FIRMWARE FEATURES

(71) Applicant: American Megatrends International, LLC, Norcross, GA (US)

(72) Inventors: Kai Yau, Duluth, GA (US); William Gysin, Jefferson, GA (US); Eric Law, Peachtree Corners, GA (US)

(73) Assignee: American Megatrends International, LLC, Norcross, GA (US)

( * ) Notice: Subject to any disclaimer, the term of this patent is extended or adjusted under 35 U.S.C. 154(b) by 128 days.

(21) Appl. No.: 15/590,790

(22) Filed: May 9, 2017

(51) Int. Cl.
| G06F 21/57 | (2013.01) |
| G06F 21/31 | (2013.01) |
| G06F 21/60 | (2013.01) |
| H04L 9/08 | (2006.01) |
| H04L 9/32 | (2006.01) |
| G06F 9/4401 | (2018.01) |

(52) U.S. Cl.
CPC ......... *G06F 21/572* (2013.01); *G06F 21/31* (2013.01); *G06F 21/57* (2013.01); *G06F 21/602* (2013.01); *H04L 9/0866* (2013.01); *H04L 9/3234* (2013.01); *G06F 9/4406* (2013.01)

(58) Field of Classification Search
CPC .. G06F 21/572; G06F 21/50–57; G06F 21/31; G06F 21/60–629; G06F 21/78; G06F 21/805; G06F 21/86–87; G06F 21/10–14; H04L 9/0866; H04L 9/3234
See application file for complete search history.

(56) References Cited

U.S. PATENT DOCUMENTS

| 8,769,667 B2 * | 7/2014 | Nishida | G06F 21/575 726/17 |
| 2005/0108515 A1 * | 5/2005 | Rangarajan | G06F 9/4401 713/2 |
| 2007/0150681 A1 * | 6/2007 | Frank | G06Q 20/341 711/163 |
| 2007/0288737 A1 * | 12/2007 | Boyle | G06F 8/65 713/1 |
| 2007/0300207 A1 * | 12/2007 | Booth | G06F 21/575 717/126 |
| 2012/0005480 A1 * | 1/2012 | Batke | G06F 21/572 713/175 |
| 2012/0159599 A1 * | 6/2012 | Szoke | G06F 21/32 726/7 |

(Continued)

*Primary Examiner* — Khalil Naghdali
*Assistant Examiner* — Shaqueal D Wade
(74) *Attorney, Agent, or Firm* — Newport IP, LLC; Leonard J. Hope (57) ABSTRACT

A system may be configured to receive via a user interface a user-initiated prompt to begin start-up of a computer system firmware via access to a firmware start-up utility. The system may also generate a request for user authentication, and detect a private key for user authentication. The system may also determine whether the private key corresponds to a public key previously registered with the computer system firmware, and initiate, when the private key corresponds to the public key, completion of the start-up of the computer system firmware and allowance of operation of the computer system firmware via access to the firmware start-up utility. When the private key does not correspond to the public key, the system may prevent at least one aspect of an operation associated with the start-up of the computer system firmware.

28 Claims, 3 Drawing Sheets

(56) References Cited

U.S. PATENT DOCUMENTS

| | | | |
|---|---|---|---|
| 2013/0145440 A1* | 6/2013 | Adam | G06F 21/40 |
| | | | 726/5 |
| 2014/0068281 A1* | 3/2014 | Diamant | G06F 1/3268 |
| | | | 713/300 |
| 2015/0089221 A1* | 3/2015 | Taylor | H04W 12/08 |
| | | | 713/168 |
| 2015/0100801 A1* | 4/2015 | Maity | G06F 1/3206 |
| | | | 713/320 |
| 2015/0304233 A1* | 10/2015 | Krishnamurthy | H04L 47/762 |
| | | | 709/226 |
| 2017/0168844 A1* | 6/2017 | Swanson | G06F 9/4401 |
| 2018/0004952 A1* | 1/2018 | Samuel | G06F 21/575 |
| 2018/0165455 A1* | 6/2018 | Liguori | G06F 21/575 |

* cited by examiner

USE OF SECURITY KEY TO ENABLE FIRMWARE FEATURES

BACKGROUND

Computing systems often include a firmware to facilitate control of low level operations of the computing system. Firmware may include a firmware start-up utility for starting firmware operations and accessing and permitting changes to system parameters that are controlled by the firmware. Access to the start-up utility is often protected by a password to prevent access by unauthorized users. However, password protection may suffer from a number of possible drawbacks. For example, passwords may be stolen or illicitly determined, thereby permitting unauthorized users to gain access to the firmware start-up utility. The present disclosure relates to alternative or additional ways to prevent the start-up or the change of system parameters associated with firmware by unauthorized users.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

As outlined above, computing systems often include a firmware to facilitate control of low level operations of the computing system. Firmware may include a firmware start-up utility for starting firmware operations and accessing and permitting changes to system parameters that are controlled by the firmware. In order to prevent unauthorized users from gaining access to the start-up utility and either starting the firmware or making changes system parameters associated with the firmware, access to the start-up utility may be limited to authorized users. As a result, access is often protected by a password to prevent access by unauthorized users. However, passwords may be stolen or illicitly determined, thereby permitting unauthorized users to gain access to the firmware start-up utility.

This disclosure is generally directed to technologies for providing a private key and a public key pair for facilitating authorized access to a computer system firmware start-up utility configured to enable start-up of the firmware and/or changes in the system parameters associated with operation of the firmware. In some examples, the systems and methods may be provided for which a two-factor authentication may be required to gain authorization for access to the firmware start-up utility. For example, a first factor authentication may be provided by entry of a user identification and/or a password, and a second factor authentication may be provided by a private key that corresponds to a public key previously registered with the computer system firmware. In some examples, only the private key may be required to gain authorization for access to the firmware start-up utility. In some examples, the private key and/or the public key may be encrypted.

For example, a system including one or more processors, and memory storing computer-executable instructions that, when executed, cause the one or more processors to perform acts that may include, in a computer system firmware including a start-up utility, receiving via a user interface a user-initiated prompt to begin start-up of the computer system firmware via access to the start-up utility. In some examples, the acts may also include receiving user credentials previously registered with the computer system firmware, wherein the user credentials may include at least one of a user identification or a user password. The acts may further include generating via the computer system firmware a request for user authentication, and detecting via the computer system firmware a private key for the user authentication. In some examples, detecting the private key may include detecting the physical presence of a security key device configured to provide the private key. In some examples, the physical presence of the security key device may be associated with the start-up of the computer system firmware. The acts may also include determining via the computer system firmware whether the private key corresponds to a public key previously registered with the computer system firmware, and initiating, when the private key corresponds to the public key, completion of the start-up of the computer system firmware and allowing operation of the computer system firmware via access to the start-up utility. In some examples, the acts may also include determining via the computer system firmware whether the private key and the user credentials correspond to the public key previously registered with the computer system firmware. The acts may also include preventing, when at least one of the private key or the user credentials do not correspond to the public key, at least one aspect of an operation associated with the start-up of the computer system firmware, for example, by preventing access to the start-up utility. Some examples of such a system may result in a two-factor authentication for gaining access to a firmware start-up utility. In some examples, the private key and encrypted public key pair may provide greater security than a single factor authentication requiring only a user identification and/or a user password. As a result, some examples may more effectively prevent unauthorized users from gaining access to a firmware start-up utility.

In some examples, detecting via the computer system firmware the physical presence of the security key device may include determining whether the security key device has been activated by the user. For example, some security key devices may include a connection end configured to be received in a universal serial bus (USB) port of a computer associated with the firmware and an activation portion configured to activate the security key when touched by a human. For example, the activation portion may be configured to use the electrical charge (e.g., from static electricity) associated with the touch of the user and transmit the private key via the USB port to the computer system firmware. In some examples, the biometric identity of the user is not relevant to whether the activation is accepted. In some examples, the biometric identity of the user may be relevant to whether the activation is accepted. For example, the biometric identity may be required to match an authorized identity in order for authentication to be accepted.

In some examples, receiving via the user interface the user-initiated prompt may include receiving user credentials previously registered with the computer system firmware. In some examples, the user credentials may include one or more of a user identification and a user password. In some examples, determining via the computer system firmware whether the private key corresponds to the public key may include determining whether the private key corresponds to the user credentials. In some examples, the security key device, its associated encrypted private key, and the associated encrypted public key may be registered along with the credentials with the computer system firmware, so that the computer system firmware may determine whether the credentials, the private key, and the public key correspond to one another. If they do, the firmware may permit access to the firmware start-up utility. If they do not, the computer system firmware may not permit access to the firmware start-up utility.

In some examples, when the private key does not correspond to the public key, the acts may further include sounding an audible alarm and/or activating a visual alarm. Other responsive actions are contemplated.

In some examples, detecting via the computer system firmware the physical presence of the security key device may include detecting the security key device in a USB port of a computer associated with the start-up of the computer system firmware. For example, the computer executing the firmware may include a USB port, and the security key device may be received in the USB port.

In some examples, preventing at least one aspect of an operation associated with the start-up of the computer system firmware may include preventing completion of the start-up of the computer system firmware. For example, unless the presence of the security key device and its associated encrypted private key are detected, the computer system firmware (e.g., the firmware start-up utility) may prevent the firmware from completing the start-up procedures, which in turn, may prevent operation of the remainder of the computer software and/or components.

In some examples, preventing at least one aspect of an operation associated with the start-up of the computer system firmware may include preventing serial AT attachment (SATA) hard drive encryption. This may prevent communication between host bus adaptors and mass storage devices of the computer system, such as, for example, hard disk drives, optical drives, and solid state drives.

In some examples, preventing at least one aspect of an operation associated with the start-up of the computer system firmware may include preventing setup of the advanced configuration and power interface (ACPI) value associated with the computer system. This may prevent a user from changing the configuration of power usage distributed among the components of the computer system.

In some examples, preventing at least one aspect of an operation associated with the start-up of the computer system firmware may include preventing the user from selecting start-up options associated with the computer system firmware.

In some examples, preventing at least one aspect of an operation associated with the start-up of the computer system firmware may include disabling the intelligent platform management interface (IPMI) associated with the computer system.

In some examples, preventing at least one aspect of an operation associated with the start-up of the computer system firmware may include reducing the speed of operation of the computer system firmware. For example, although the computer system may complete its start-up procedures, completion of the start-up procedures may occur more slowly than normal.

In some examples, preventing at least one aspect of an operation associated with the start-up of the computer system firmware may include disabling performance options associated with the computer system firmware. For example, with proper authentication, the user may change various system parameters controlled by the firmware that may affect the performance of certain operations of the computer system. In some examples, at least some such changes may be prevented without proper authentication.

In some examples, preventing at least one aspect of operation associated with the start-up of the computer system firmware may include disabling one or more of a peripheral component interconnect (PCI) device or a USB device.

In some examples, preventing at least one aspect of an operation associated with the start-up of the computer system firmware may include disabling the southbridge. This may prevent operation of input/output functions of the computing system.

In some examples, preventing at least one aspect of an operation associated with the start-up of the computer system firmware may include disabling flash-ability of the basic input/output system (BIOS) of the computer system firmware. This may prevent updating the BIOS firmware and/or adding new features to the BIOS firmware without proper authentication.

In some examples, preventing at least one aspect of an operation associated with the start-up of the computer system firmware may include disabling the option read only memory (OPROM) associated with the computing system. This may prevent operation of, for example, adaptor cards configured to control peripheral devices associated with the computing system that are activated during firmware start-up procedures.

In some examples, preventing at least one aspect of an operation associated with the start-up of the computer system firmware may include limiting user access to a system management basic input/output system (SMBIOS) data. This may prevent an unauthorized user from changing the data structures and/or accessing methods related to reading information stored in the BIOS of the computer system.

The disclosure is also generally directed to a computer-implemented method for authenticating a user for an operation associated with a start-up of a computer system firmware including a start-up utility. The method may include computer-implemented operations for receiving in a computer system firmware from a user interface a user-initiated prompt to begin start-up of the computer system firmware via access to the start-up utility, and generating via the computer system firmware a request for user authentication. The method may also include detecting via the computer system firmware a physical presence of a security key device configured to provide a private key for the user authentication, wherein the physical presence is associated with a computer associated with the start-up of the computer system firmware. The method may further include determining via the computer system firmware whether the private key corresponds to a public key previously registered with the computer system firmware, and initiating, when the private key corresponds to the public key, completion of the start-up of the computer system firmware and allowance of operation of the computer system firmware via the start-up utility via access to the start-up utility. The method may also include preventing, when the private key does not correspond to the public key, at least one aspect of an operation associated with the start-up of the computer system firmware, for example, by preventing access to the start-up utility.

Figure 1:
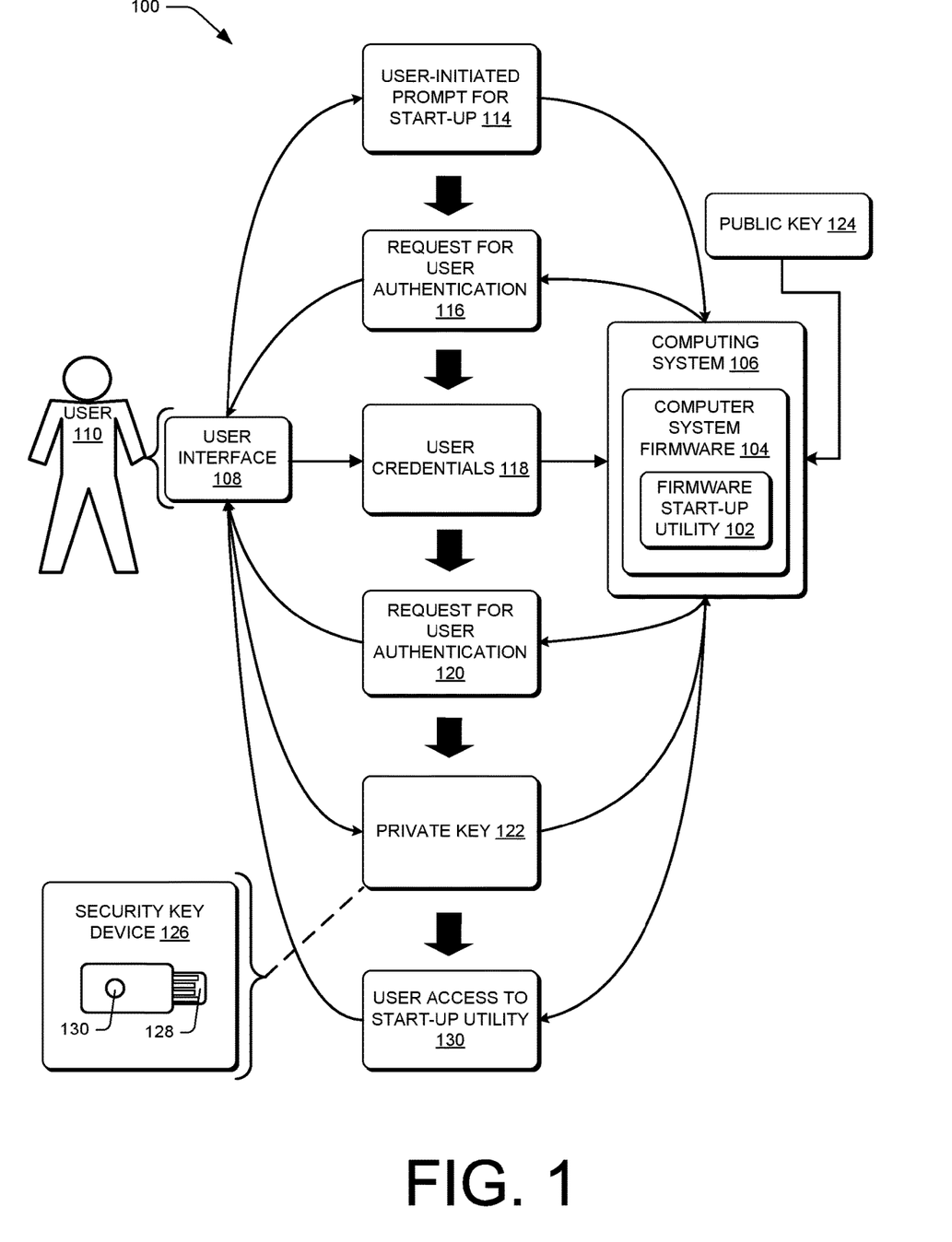
FIG. 1 is a schematic diagram of an example computing environment for accessing an example firmware start-up utility.

FIG. 1 is a schematic diagram of an example computing environment 100 for accessing an example firmware start-up utility 102 associated with an example computer system firmware 104 of an example computing system 106. The example computing environment 100 shown in FIG. 1 includes a user interface 108 configured to facilitate interaction between a user 110 and the computer system firmware 104. The computing system 106 may be a server computer, a personal computer (a "PC"), such as a desktop workstation, a laptop, or a notebook, a personal digital assistant (a "PDA"), a wireless telephone, a set-top box, a gaming console, or any other type of computing system that allows user access to configurable settings in the computer system firmware 104. The user interface 108 may include one or more of a monitor, a keyboard, a touchpad, a mouse, a voice-entry system, and any other system configured to facilitate interaction between the user 110 and the computing system 106.

In some examples, the computing system 106 may be configured to execute the computer system firmware 104. The computer system firmware 104 may be used to facilitate control of low-level operation of the computing system 106. For example, the computer system firmware 104 may include a basic input/output system (BIOS) firmware, an extensible firmware interface (EFI) compatible firmware, or other types of firmware. In the example shown, the computer system firmware 104 may include the firmware start-up utility 102. In some examples, the firmware start-up utility 102 may be configured to provide an interface for displaying information, for example, via the user interface 108 to the user 110, relating to the configuration of the computing system 106, starting-up the computer system 106, and/or changing the configuration of the computing system 106. The computer system firmware 104 may also include executable program code for authenticating user access to the firmware start-up utility 102, for example, in the manner disclosed herein.

FIG. 1 illustrates an example interaction between the user 110 and the example computing system 106 for authenticating the user 110 to facilitate start-up of the computer system firmware 104 and allowance of operation of the computer system firmware 104 via the firmware start-up utility 102 via access to the start-up utility 102. For example, as shown in FIG. 1, the user 110 may send a user-initiated prompt 114 via the user interface 108 to begin start-up of the computer system firmware 104, for example, via access to the firmware start-up utility 102. The prompt 114 is received by the computer system firmware 104, and in some examples, the computer system firmware 104 may be configured to generate a request for user authentication 116. The request 116 may be received by the user 110 via the user interface 108, and the user 110 may respond to the request 116 by providing via the user interface 108 user credentials 118. The user credentials 118 may include a user identification and/or a user password. In some examples, the user credentials 118 may be stored in the computer system firmware 104, so that upon receipt of the user credentials 118 by the computer system firmware 104, the computer system firmware 104 may be configured to generate an additional request for user authentication 120, which is sent to the user 110 via, for example, the user interface 108. If, on the other hand, the user credentials 118 received by the computer system firmware 104 are not recognized by the computer system firmware 104, the access to the firmware start-up utility 102 will be denied to the user 110. In such circumstances, the computer system firmware 104 may prevent completion of the start-up procedure and/or reduce or prevent computer system operations that would be available to an authorized user.

In the example shown in FIG. 1, upon receipt of the request for user authentication 120 via the user interface 108, the user 110 may provide a private key 122 that corresponds to a public key 124, for example, previously registered with the computer system firmware 104, as described herein. For example, the computer system firmware 104 may be configured to detect a physical presence of a security key device 126 configured to provide the private key 122 for user authentication. In some examples, the physical presence may be associated with a computer associated with the start-up of the computer system firmware 104, such as, for example, the computing system 106. In some examples, the private key 122 and/or the public key 124 may be encrypted.

In some examples, detecting the physical presence of the security key device 126 may include determining whether the security key device 126 has been activated by the user 110. For example, some security key devices may include a connection end 128 configured to be received in a universal serial bus (USB) port of a computer associated with (e.g., in communication with) the computer system firmware 104 and an activation portion 130 configured to activate the security key device when touched by a human. For example, the activation portion 130 may be configured to use the electrical charge (e.g., from static electricity) associated with the touch of the user 110 and transmit the private key 122 via the USB port to the computer system firmware 104. In some examples, the security key device 126 may have an individualized, secure chip, which performs cryptographic functions triggered by a user touching the security key device 126 in a manner that activates a capacitive sensor in the security key device 126 via the electricity naturally produced by the human body. In some examples, the security key device 126 provides a unique encrypted private key 122 corresponding to a pubic key 124, such that only the private key 122 supplied by the security key device 126 corresponds to the public key 124, and thus, the security key device 126 is necessary for authentication. In some examples, the security key device may be a security key device sometimes referred to as a "unified, two-factor security key," for example, such as a security key device supplied by FIDO™.

After detection of the private key 122, in some examples, the computer system firmware 104 may be configured to determine whether the private key 122 corresponds to the public key 124. In some examples, the private key 122 and the public key 124 may be registered, for example, with the computer system firmware 104, so that the computer system firmware 104 recognizes that the private key 122 and the public key 124 correspond to one another for the purpose of authenticating the user 110 and allowing access to the firmware start-up utility 102. For example, prior to use, the private key 122 may be registered with the computer system firmware 104 by inserting the security key device 126 into a USB port associated with the computing system 106, at which point the computer system firmware 104 may verify the user 110, for example, by the provision by the user 110 of the user identification and/or a user password, at which point the computer system firmware 104 verifies the user and generates a challenge requesting the user 110 to activate the private key 122 by activating the security key device 126, for example, by touching the activation portion 130 on the security key device 126, so that the private key 122 is provided to the computer system firmware 104. The computer system firmware 104 verifies the response, thereby creating the private key 122 and encrypted public key 124 pair that corresponds to the credentials (e.g., the user identification and/or password) of the user 110. Thereafter, in some examples, the user 110, in order to gain access to the firmware start-up utility 102, may be required (e.g., may be prompted by the computer system firmware 104) to provide the user credentials 118, followed by providing the private key 122. In such examples, the computer system firmware 104 may verify that the user credentials 118 and the private key 122 match or correspond to the public key 124 that has been registered with the computer system firmware 104.

For example, as shown in FIG. 1, once the private key 122 has been received by the computer system firmware 104, when the computer system firmware 104 determines that encrypted private key 122 corresponds to the public key 124, thereby completing the registered pair, the computer system firmware 104 may be configured to complete the start-up of the computer system firmware 104 and allow the user 110 access to the firmware start-up utility 130. Thus, under such circumstances, in some examples, the computer system firmware 104 may be allowed to operate and control start-up of the computer system 106 and/or allow the user 110 access to various set-up options associated with the firmware start-up utility 102.

If, in contrast, the computer system firmware 104 determines that the private key 122 is missing or does not correspond to the registered encrypted public key 124, in some examples, the computer system firmware 104 may prevent at least one aspect of an operation associated with the start-up of the computer system firmware 104, for example, by preventing the user 110 from gaining access to the firmware start-up utility 102. In some examples, as explained in more detail herein, this may prevent the computing system 106 from completing its normal start-up procedures and/or prevent the user 110 from access to various set-up options associated with the firmware start-up utility 102.

Figure 2:
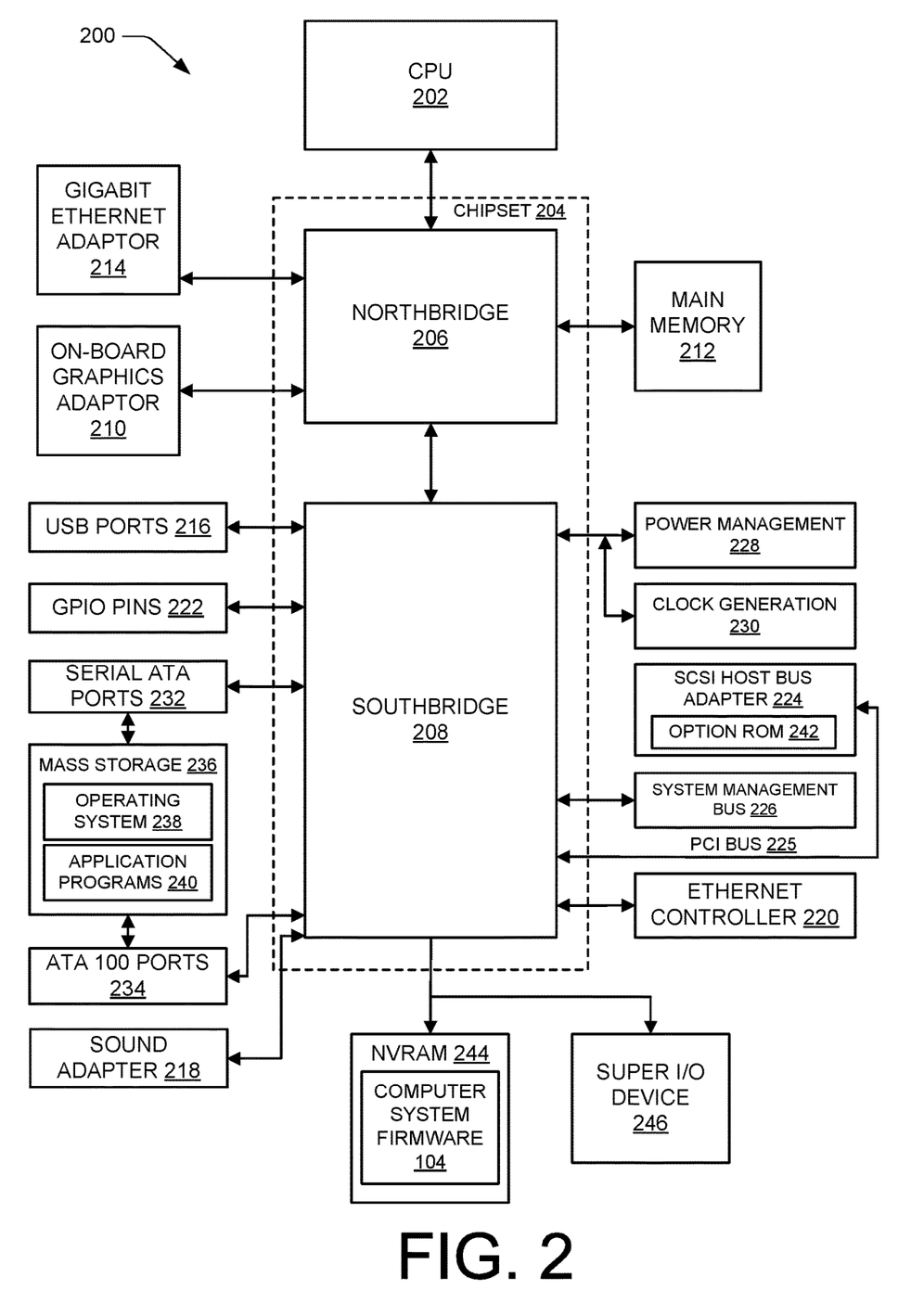
FIG. 2 is a schematic diagram of an example computer architecture showing various example components of a computing system that provides an example operating environment for implementations presented herein.

FIG. 2 is an example computer architecture 200 for implementing examples described herein. It should be appreciated that although the examples described herein are discussed in the context of a conventional desktop or server computer, the examples may be used with virtually any type of computing device. The example computer architecture 200 shown in FIG. 2 may be provided for the example computing system 106.

In order to provide the functionality described herein, the computing system 106 may include a baseboard, or motherboard. The motherboard may be a printed circuit board to which a multitude of components or devices may be connected by way of a system bus or other electrical communication path. In some examples, a central processing unit (CPU) 202 may operate in conjunction with a chipset 204. The CPU 202 may be a standard central processor that performs arithmetic and logical operations necessary for the operation of the computing system.

The example chipset 204 shown in FIG. 2 includes a northbridge 206 and a southbridge 208. The northbridge 206 may provide an interface between the CPU 202 and the remainder of the computing system 106. The northbridge 206 may also provide an interface to an on-board graphics adapter 210 and to a random access memory (RAM) used as the main memory 212 in the computing system 106. The northbridge 206 may also include functionality for providing networking functionality through a gigabit Ethernet adapter 214. The gigabit Ethernet adapter 214 may be configured to connect the computing system 106 to another computer via a network. Connections that may be made by the gigabit Ethernet adapter 214 may include local area network (LAN) or wide area network (WAN) connections. LAN and WAN networking environments are common in offices, enterprise-wide computer networks, intranets, and the Internet.

The northbridge 206 may be coupled and in communication with the southbridge 208. The southbridge 208 may be responsible for controlling many of the input/output functions of the computing system 106. For example, the southbridge 208 may provide one or more universal serial bus (USB) ports 216, a sound adapter 218, an Ethernet controller 220, and one or more general purpose input/output (GPIO) pins 222. The southbridge 208 may also provide a bus for interfacing peripheral card devices such as a BIOS boot system-compliant SCSI host bus adapter 224. In some examples, the bus may include a peripheral component interconnect (PCI) bus 225. The southbridge 208 may also provide a system management bus 226 for use in managing the various components of the computing system 106. Power management circuitry 228 and clock generation circuitry 230 may also be used during the operation of the southbridge 208.

The southbridge 208 is also operative to provide one or more interfaces for connecting mass storage devices to the computing system 106. For example, the southbridge 208 may include a serial advanced technology attachment (SATA) adapter for providing one or more SATA ports 232 and an ATA 100 adapter for providing one or more ATA 100 ports 234. The SATA ports 232 and the ATA 100 ports 234 may be, in turn, connected to one or more mass storage devices 236 storing an operating system 238 and application programs 240. The operating system 238 may include a set of programs that control operations of the computing system 106 and allocation of resources. Application programs 240 may be software that runs on top of the operating system software, and uses computer resources made available through the operating system 238 to perform application specific tasks desired by the user 110.

The mass storage devices connected to the southbridge 208 and the SCSI host bus adapter 224, and the associated computer-storage media (e.g., option read only memory (OPROM) 242), may provide non-volatile storage for the computing system 106. Although the description of computer-storage media contained herein refers to a mass storage device, such as a hard disk or CD-ROM drive, it should be appreciated by those skilled in the art that computer-storage media may be any available non-transitory media that can be accessed by the computing system 106. Computer storage media may include volatile and non-volatile, removable and non-removable media implemented in any method or technology for the non-transitory storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computing system.

In some examples, a low pin count (LPC) interface may also be provided by the southbridge 208 for connecting a "Super I/O" device 246. The Super I/O device 246 may be configured to provide a number of input/output ports, including, for example, a keyboard port, a mouse port, a serial interface, a parallel port, and other types of input/output ports. The LPC interface may also couple a computer storage media, such as a ROM or a flash memory, such as a non-volatile random access memory (NVRAM) 244 for storing the computer system firmware 104, which may include program code containing basic routines that help to start-up the computing system 106 and/or to transfer information between elements within the computing system 106. In some examples, the computer system firmware 104 may be a firmware that is compatible with the UEFI Specification. The LPC interface may also be utilized to connect an NVRAM 244 to the computing system 106. The NVRAM 244 may be used by the computer system firmware 104 to store configuration data for the computing system 106. The configuration data for the computing system 106 may also be stored on the same NVRAM 244 as the computer system firmware 104.

In some examples, the computing system 106 may be implemented as a conventional computer system, an embedded control computer, a laptop, or a server computer, a mobile device, a set-top box, a kiosk, a vehicular information system, a mobile telephone, a customized machine, or other hardware platform. The CPU 202 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

It should be appreciated that the program modules disclosed herein, including the computer system firmware 104, may include software instructions that, when loaded into the CPU 202 and executed, transform a general-purpose computing system into a special-purpose computing system 106 customized to facilitate all, or part of, the operations disclosed herein. As detailed throughout this description, the program modules may provide various tools or techniques by which the computing system 106 may participate within the overall systems or operating environments using the components, logic flows, and/or data structures discussed herein.

The CPU 202 may be constructed from any number of transistors or other circuit elements, which may individually or collectively assume any number of states. More specifically, the CPU 202 may operate as a state machine or finite-state machine. Such a machine may be transformed to a second machine, or a specific machine, by loading executable instructions contained within the program modules. These computer-executable instructions may transform the CPU 202 by specifying how the CPU 202 transitions between states, thereby transforming the transistors or other circuit elements constituting the CPU 202 from a first machine to a second machine, wherein the second machine may be specifically configured to perform the operations disclosed herein. The states of either machine may also be transformed by receiving input from one or more user input devices, network interfaces 214, 220, other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory 212, 104, 244 when the software or computer system firmware 104 is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the computing system 106 may comprise other types of computing devices, including hand-held computers, embedded computer systems, personal digital assistants, and other types of computing devices known to those skilled in the art. It is also contemplated that the computing system 106 may not include all of the components shown in FIG. 2, may include other components that are not explicitly shown in FIG. 2, or may utilize an architecture completely different than that shown in FIG. 2.

Referring to FIG. 1, in some examples, determining via the computer system firmware 104 whether the private key 122 corresponds to the public key 124 may include determining whether the private key 122 corresponds to the user credentials 118. In some examples, the security key device 126, its associated encrypted private key 122, and the associated encrypted public key 124 may be registered along with the credentials 118 with the computer system firmware 104, so that the computer system firmware 104 may determine whether the credentials 118, the private key 122, and the public key 124 correspond to one another. If they do, the computer system firmware 104 may permit the user 110 access to the firmware start-up utility 102. If they do not, the computer system firmware 104 may not permit access to the firmware start-up utility 102. and one or more of the following actions may occur.

For example, when the private key 122 does not correspond to the public key 124, the computer system firmware 104 be configured to cause an audible or visual alarm associated with the computing system 106 to sound. Other responsive actions are contemplated, for example, as noted below.

In some examples, detecting via the computer system firmware 104 the physical presence of the security key device 126 may include detecting the security key device 126 in a USB port 216 of a computer associated with the start-up of the computer system firmware 104. For example, the computing system 106 executing the computer system firmware 104 may include a USB port 216, and the security key device 126 may be received in the USB port 216. For example, referring to FIG. 2, the connecting portion 128 may be received in a USB port 216, and the security key device 126 may be activated when the user 110 touches the activation portion 130, thereby providing the private security key 122 to the computer system firmware 104.

In some examples, when the authenticating fails, preventing at least one aspect of an operation associated with the start-up of the computer system firmware 104 may include preventing completion of the start-up of the computer system firmware 104. For example, unless the presence of the security key device 126 and its associated encrypted private key 122 are detected, the computer system firmware 104 (e.g., the firmware start-up utility 102) may prevent the computer system firmware 104 from completing the start-up procedures, which in turn, may prevent operation of the remainder of the computer software and/or components.

In some examples, when the authentication fails, preventing at least one aspect of an operation associated with the start-up of the computer system firmware 104 may include preventing serial AT attachment (SATA) 220 hard drive encryption. This may prevent communication between host bus adaptors and mass storage devices of the computing system 106, such as, for example, hard disk drives, optical drives, and solid state drives.

In some examples, when the authentication fails, preventing at least one aspect of an operation associated with the start-up of the computer system firmware 104 may include preventing setup of the advanced configuration and power interface (ACPI) value associated with the computing system 106. This may prevent changing the configuration of power usage is distributed among the components of the computing system 106, which may be controlled by, for example, the power management 228.

In some examples, when the authentication fails, preventing at least one aspect of an operation associated with the start-up of the computer system firmware 104 may include preventing selection of start-up options associated with the computer system firmware 104.

In some examples, when the authentication fails, preventing at least one aspect of an operation associated with the start-up of the computer system firmware 104 may include disabling the intelligent platform management interface (IPMI) associated with the computing system 106.

In some examples, when the authentication fails, preventing at least one aspect of an operation associated with the start-up of the computer system firmware 104 may include reducing the speed of operation of the computer system firmware 104. For example, although the computing system 106 may complete its start-up procedures, the completion may occur more slowly than when the user has been authenticated.

In some examples, when the authentication fails, preventing at least one aspect of an operation associated with the start-up of the computer system firmware 104 may include disabling performance options associated with the computer system firmware 104. For example, with proper authentication, various system parameters controlled by the computer system firmware 104 may be changed that may affect the performance of certain operations of the computing system 106. In some examples, at least some such changes may be prevented without proper authentication.

In some examples, when the authentication fails, preventing at least one aspect of operation associated with the start-up of the computer system firmware 104 may include disabling one or more of a peripheral component interconnect (PCI) device or a USB device.

In some examples, when the authentication fails, preventing at least one aspect of an operation associated with the start-up of the computer system firmware 104 may include disabling the southbridge 208. This may prevent operation of at least some of the input/output functions of the computing system 106.

In some examples, when the authentication fails, preventing at least one aspect of an operation associated with the start-up of the computer system firmware 104 may include disabling flash-ability of the basic input/output system (BIOS) of the computer system firmware 104. This may prevent updating the BIOS firmware and/or adding new features to the BIOS firmware without proper authentication.

In some examples, when the authentication fails, preventing at least one aspect of an operation associated with the start-up of the computer system firmware 104 may include disabling the option read only memory (OPROM) 242 associated with the computing system 106. This may prevent operation of, for example, adaptor cards configured to control peripheral devices associated with the computing system 106 that are activated during firmware start-up procedures.

In some examples, when the authentication fails, preventing at least one aspect of an operation associated with the start-up of the computer system firmware 104 may include limiting access of the user 110 to a system management basic input/output system (SMBIOS) data. This may prevent an unauthorized user from changing the data structures and/or accessing methods related to reading information stored in the BIOS of the computing system 106.

Figure 3:
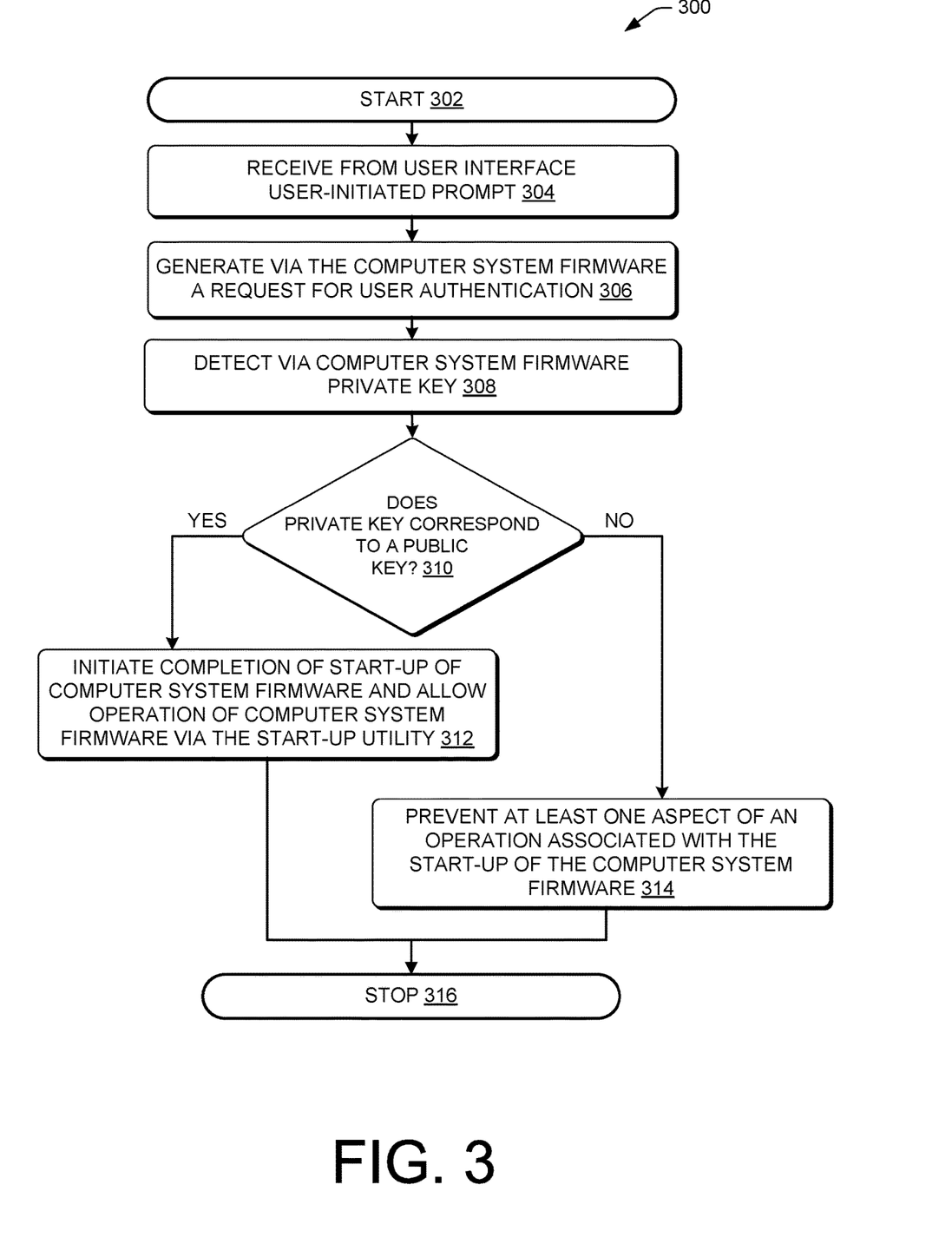
FIG. 3 is a flow diagram showing an example process for starting up an example computer system firmware.

FIG. 3 is a flow diagram of an illustrative process. The process is illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative computer-implemented process 300 for authenticating a user for an operation associated with a start-up of a computer system firmware, for example, the computer system firmware 104, which may include a firmware start-up utility 102, for example, as shown in FIG. 1. The process 300 is described with reference to the computing environment 100 and the computing architecture 200 shown in FIGS. 1 and 2, respectively.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the drawings and described herein. These operations may also be performed in parallel, or in a different order than those described herein.

At 302, the process 300 starts, and at 304, the process 300 may include receiving in a computer system firmware 104 from a user interface 108 a user-initiated prompt to begin start-up of the computer system firmware 104 via access to the start-up utility 102. For example, the user 110 (see FIG. 1) may initiate the process by sending a prompt 114 to the computing system 106.

In some examples of the process 300, at 306, the computer system firmware 104 may issue a request for user authentication. In some examples, this may include requesting the user 110 via the user interface 108 to provide user credentials 118, such as, for example, a user identification and/or a user password. In some examples, upon receipt of the user credentials 118, the computer system firmware 104 may also request the user 110 to provide a private key 122.

In some examples of the process 300, at 308, the process 300 may include detecting via the computer system firmware 104 the user credentials 118 and/or the private key 122. At 310, the process 300 may include determining via the computer system firmware 104 whether the private key 122 corresponds to a public key 124 previously registered with the computer system firmware 104, for example, as described herein. This may include detecting the physical presence of a security key device 126 configured to provide the private key 122 upon activation of the security key device 126, for example, by the user 110 touching the activation portion 130 of the security key device 126 as described herein. In some examples, this may also include determining via the computer system firmware 104, whether the user credentials 118 correspond to the private key 122 and the public key 124.

In some examples, of the process 300, if the private key 122 and/or the user credentials 118 correspond the public key 124, at 312, the computer system firmware 104 may initiate completion of the start-up of the computer system firmware 104 and allowance of operation of the computer system firmware 104, for example, via the start-up utility 102 by allowing the user 110 access to the start-up utility 102. In some examples, this may permit the user 110 to enter and/or change operational settings associated with operation of the computer system firmware 104. Thereafter, at 316, the process 300 may end.

If, however, the private key 122 and/or the user credentials 118 do not correspond to the public key 124, at 314, the computer system firmware 104 may prevent at least one aspect of an operation associated with the start-up of the computer system firmware 104. For example, completion of the start-up procedure may be prevented. In some examples, the start-up procedure may be altered, for example, as described herein. In some examples, the user 110 may be prevented from gaining access to the firmware start-up utility 102, which may prevent the user 110 from completing one or more of the various start-up options described herein. Thereafter, the process 300 may end at 316.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A non-transitory computer-readable storage medium, having computer-executable instructions stored thereupon which, when executed by the computer, cause the computer to:

generate, via a computer system firmware and responsive to a computer system start-up, a request for a user authentication;

detect via the computer system firmware, a security key device storing a private key for the user authentication;

determine via the computer system firmware whether the private key corresponds to a public key previously registered with the computer system firmware;

initiate, when the private key corresponds to the public key, completion of the start-up of the computer system firmware and allowing operation of the computer system firmware; and prevent, when the private key does not correspond to the public key, a change to a computer system parameter, the change comprising selection of start-up options associated with the computer system firmware.

2. The non-transitory computer-readable storage medium of claim 1, wherein detecting via the computer system firmware the security key device comprises determining whether the security key device has been activated.

3. The non-transitory computer-readable storage medium of claim 1, wherein receiving a user-initiated prompt comprises receiving user credentials previously registered with the computer system firmware, wherein the user credentials comprise at least one of a user identification or a user password.

4. The non-transitory computer-readable storage medium of claim 3, wherein determining via the computer system firmware-whether the private key corresponds to the public key comprises determining whether the private key corresponds to the user credentials.

5. The non-transitory computer-readable storage medium of claim 1, wherein when the private key does not correspond to the public key, the instructions further causing the computer to perform at least one of sounding an audible alarm or activating a visual alarm.

6. The non-transitory computer-readable storage medium of claim 1, wherein detecting the security key device comprises detecting the security key device in a universal serial bus (USB) port.

7. The non-transitory computer-readable storage medium of claim 1, wherein at least one of the start-up options associated with the computer system firmware comprises preventing completion of the start-up of the computer system firmware.

8. The non-transitory computer-readable storage medium of claim 1, wherein at least one of the start-up options associated with the computer system firmware comprises preventing serial AT attachment (SATA) hard drive encryption.

9. The non-transitory computer-readable storage medium of claim 1, wherein at least one of the start-up options associated with the computer system firmware comprises preventing setup of an advanced configuration and power interface (ACPI) value.

10. The non-transitory computer-readable storage medium of claim 1, wherein at least one of the start-up options associated with the computer system firmware comprises disabling an intelligent platform management interface (IPMI).

11. The non-transitory computer-readable storage medium of claim 1, wherein at least one of the start-up options associated with the computer system firmware comprises reducing speed of operation of the computer system firmware.

12. The non-transitory computer-readable storage medium of claim 1, wherein at least one of the start-up options associated with the computer system firmware comprises disabling performance options associated with the computer system firmware.

13. The non-transitory computer-readable storage medium of claim 1, wherein at least one of the start-up options associated with the computer system firmware comprises disabling at least one of a peripheral component interconnect (PCI) device or a universal serial bus (USB) device.

14. The non-transitory computer-readable storage medium of claim 1, wherein at least one of the start-up options associated with the computer system firmware comprises disabling a southbridge.

15. The non-transitory computer-readable storage medium of claim 1, wherein at least one of the start-up options associated with the computer system firmware comprises disabling flash-ability of a basic input/output system (BIOS) of the computer system firmware.

16. The non-transitory computer-readable storage medium of claim 1, wherein at least one of the start-up options associated with the computer system firmware comprises disabling option read only memory (OPROM).

17. The non-transitory computer-readable storage medium of claim 1, wherein at least one of the start-up options associated with the computer system firmware comprises limiting user access to a system management basic input/output system (SMBIOS) data.

18. A computer-implemented method for authenticating a user for an operation of a computer system firmware comprising:
generating via a computer system firmware and responsive to a computer system start-up, a request for a user authentication;
detecting via the computer system firmware, a security key device storing a private key for the user authentication;
determining via the computer system firmware whether the private key corresponds to a public key previously registered with the computer system firmware;
initiating, when the private key corresponds to the public key, completion of the start-up of the computer system firmware and allowance of operation of the computer system firmware; and
preventing, when the private key does not correspond to the public key, a change to a computer system parameter, the change comprising selection of start-up options associated with the computer system firmware.

19. The method as recited in claim 18, wherein detecting via the computer system firmware the security key device comprises determining whether the security key device has been activated.

20. The method as recited in claim 18, wherein receiving a user-initiated prompt comprises receiving user credentials previously registered with the computer system firmware, wherein the user credentials comprise at least one of a user identification or a user password.

21. The method as recited in claim 20, wherein determining whether the private key corresponds to a public key comprises determining whether the private key corresponds to the user credentials.

22. The method as recited in claim 18, wherein when the private key does not correspond to the public key, the method further comprising sounding an audible alarm.

23. The method as recited in claim 18, wherein detecting the security key device comprises detecting the security key device in a universal serial bus (USB) port.

24. A system comprising:
one or more processors; and
memory storing computer-executable instructions that, when executed, cause the one or more processors to perform acts comprising:
receiving, via a user interface, a user-initiated prompt to begin start-up of the computer system firmware;
receiving user credentials previously registered with the computer system firmware, wherein the user credentials comprise at least one of a user identification or a user password;
generating via the computer system firmware a request for a user authentication;
detecting via the computer system firmware a security key device storing a private key to provide the user authentication;
determining via the computer system firmware whether the private key and the user credentials correspond to a public key previously registered with the computer system firmware;
initiating, when the private key and the user credentials correspond to the public key, completion of the start-up of the computer system firmware and allowing operation of the computer system firmware; and
preventing, when at least one of the private key or the user credentials do not correspond to the public key, a change to a computer system parameter, the change comprising selection of start-up options associated with the computer system firmware.

25. The system as recited in claim 24, wherein detecting via the computer system firmware the private key comprises detecting a physical presence of a security key device configured to provide the private key.

26. The system s recited in claim 25, wherein detecting the private key comprises transmitting the private key using an electric charge received from the human touch.

27. The system as recited in claim 25, wherein detecting the private key comprises detecting the security key device in a universal serial bus (USB).

28. The system as recited in claim 25, wherein detecting the security key device comprises determining whether the security key device has been activated by the user.

* * * * *